United States Patent
Bousquet et al.

(10) Patent No.: US 10,496,912 B2
(45) Date of Patent: Dec. 3, 2019

(54) ELECTRONIC UNIT WITH A SECURE ELEMENT AND METHOD CARRIED OUT IN SUCH AN ELECTRONIC UNIT FACILITATING COMMUNICATION WITH THE SECURE ELEMENT

(71) Applicant: OBERTHUR TECHNOLOGIES, Colombes (FR)

(72) Inventors: Nicolas Bousquet, Colombes (FR); Florian Vallee, Colombes (FR)

(73) Assignee: IDEMIA France, Colombes (FR)

( * ) Notice: Subject to any disclaimer, the term of this patent is extended or adjusted under 35 U.S.C. 154(b) by 0 days.

(21) Appl. No.: 15/740,775

(22) PCT Filed: Jun. 21, 2016

(86) PCT No.: PCT/FR2016/051520
§ 371 (c)(1),
(2) Date: Dec. 28, 2017

(87) PCT Pub. No.: WO2017/001746
PCT Pub. Date: Jan. 5, 2017

(65) Prior Publication Data
US 2018/0197056 A1 Jul. 12, 2018

(30) Foreign Application Priority Data
Jun. 30, 2015 (FR) .................... 15 56170

(51) Int. Cl.
*G06K 19/07* (2006.01)
*G06K 19/077* (2006.01)

(52) U.S. Cl.
CPC ..... *G06K 19/0721* (2013.01); *G06K 19/0718* (2013.01); *G06K 19/07733* (2013.01)

(58) Field of Classification Search
CPC combination set(s) only.
See application file for complete search history.

(56) References Cited

U.S. PATENT DOCUMENTS 7,815,125 B2 10/2010 Stranges et al.
2004/0211843 A1* 10/2004 Boker .............. G06K 19/07732
235/492

(Continued)

FOREIGN PATENT DOCUMENTS

EP 1975855 10/2008
EP 2 207 131 A1 7/2010

(Continued)

OTHER PUBLICATIONS

International Search Report, dated Nov. 25, 2016, from corresponding PCT application No. PCT/FR2016/051520.

*Primary Examiner* — Raymond N Phan
(74) *Attorney, Agent, or Firm* — Young & Thompson (57) ABSTRACT

An electronic unit includes a communication interface, a processor, a secure element, and a sub-system. The processor is connected to the communication interface by a first bus, to the secure element by a second bus and to the sub-system. The processor is designed to operate in a first mode, in which, at the second bus, it reproduces the signals received from the communication interface at the first bus. Also disclosed is a method carried out in such an electronic unit.

18 Claims, 4 Drawing Sheets

(56) References Cited

U.S. PATENT DOCUMENTS

| | | | |
|---|---|---|---|
| 2007/0043887 A1* | 2/2007 | Wang | G06F 13/387 |
| | | | 710/62 |
| 2007/0174548 A1* | 7/2007 | Wang | G06F 12/1408 |
| | | | 711/115 |
| 2008/0237357 A1 | 10/2008 | Stranges et al. | |
| 2010/0031026 A1* | 2/2010 | Cizas | G06F 21/76 |
| | | | 713/156 |
| 2011/0201233 A1* | 8/2011 | Thill | G06K 19/07739 |
| | | | 439/620.15 |
| 2015/0288523 A1* | 10/2015 | Burghardt | G06F 21/34 |
| | | | 726/20 |

FOREIGN PATENT DOCUMENTS

| | | |
|---|---|---|
| EP | 2582113 | 4/2013 |
| FR | 2 680 262 A1 | 2/1993 |
| FR | 2 938 094 A1 | 5/2010 |

\* cited by examiner

ELECTRONIC UNIT WITH A SECURE ELEMENT AND METHOD CARRIED OUT IN SUCH AN ELECTRONIC UNIT FACILITATING COMMUNICATION WITH THE SECURE ELEMENT

TECHNICAL FIELD TO WHICH THE INVENTION RELATES

The present invention relates to electronic units provided for interacting with a reader, such as microcircuit cards.

It relates more particularly to an electronic unit and a method carried out in such an electronic unit.

The invention applies particularly advantageously in the case where a sub-system, such as a biometric sensor (or other user interface, for example a screen, possibly a touch screen, or a loud speaker), must be integrated in an electronic unit using an existing secure element.

TECHNOLOGICAL BACKGROUND

Electronic units are known, such as microcircuit cards, in which a secure element is directly accessible to an external reader via a communication interface, for example conforming to the ISO7816 standard.

In the context of the design of such electronic units, it is advantageous to be able to reuse a secure element used in a preceding application, notably in order to avoid the costs of development and certification of a new type of secure element.

It is moreover increasingly desired to integrate the secure element of such an electronic unit with another sub-system equipping the electronic unit, such as a biometric sensor.

These two objectives are unfortunately often incompatible because the existing secure elements use conventional means of interaction (for example conforming to the ISO7816 standard), which are rarely adapted to an exchange with the aforesaid sub-system (the available biometric sensors being able to use for example serial interfaces of the SPI or I2C type).

Moreover, from the document FR 2 938 094 there is known an electronic unit comprising a communication interface (in this instance of the USB type), a secure element, a sub-system (comprising a memory or a biometric sensor) and a processor (in this instance a microcontroller) connected to the communication interface by means of a first bus, to the secure element by means of a second bus and to the sub-system.

In this document, the processor manages the communication between the communication interface of the USB type and the secure element. This document does not therefore relate to the case where an external reader must be able to access the secure element directly via the communication interface.

SUBJECT OF THE INVENTION

In this context, the present invention proposes an electronic unit comprising a communication interface, a processor, a secure element and a sub-system, the processor being connected to the communication interface by means of a first bus, to the secure element by means of a second bus and to the sub-system (for example by means of a third bus), characterized in that the processor is designed to operate in a first mode, in which it reproduces, on the second bus, signals received from the communication interface on the first bus.

When it is received in a reader connected to the communication interface, such an electronic unit thus makes it possible to simulate a direct exchange between the reader and the secure element (when the processor is in its first operating mode); the secure element can moreover exchange with the sub-system via the processor, even if the sub-system and the secure element do not have a common interface.

According to other optional, and therefore non-limiting, features:
- the processor is designed to operate alternately in the first mode and in a second mode, in which it generates on the second bus signals determined as a function of information received from the sub-system (via the third bus) or transmits information to the sub-system as indicated below;
- the processor is designed to reproduce, on the first bus, in the first mode, signals received from the secure element on the second bus;
- the processor is designed to transmit in an anticipated manner on the first bus, in response to said signals received from the communication interface, expected signals coming from the secure element on the second bus;
- the processor is designed to transmit, in the second mode, data to the sub-system;
- the processor is designed to transmit, in the second mode, wait signals on the first bus to the communication interface;
- the processor is designed to switch from first mode to the second mode on reception of specific data on the second bus coming from the secure element;
- the processor is designed for analyzing the data transmitted on the first bus;
- the processor is designed to switch from the first mode to the second mode when specific data are transmitted on the first bus and analyzed by the processor;
- the processor is designed to switch from the second mode to the first mode when the processing of data obtained by use of the sub-system is completed within the secure element;
- the sub-system is a man machine interface;
- the sub-system is a communication module (for example of the Bluetooth or Wi-Fi type);
- the sub-system is a biometric sensor (as a variant, the sub-system could be a screen, for example a touch screen, a loud speaker or any user interface);
- said information are biometric data;
- the processor is connected to the sub-system by a serial link, for example of the SPI or I2C type;
- the communication interface has a plurality of contacts;
- the communication interface conforms to the ISO7816 standard;
- the first bus and the second bus each carry an input-output signal conforming to the ISO7816 standard.

The invention also proposes a method used in an electronic unit comprising a communication interface, a processor, a secure element and a sub-system, the processor being connected to the communication interface by means of a first bus, to the secure element by means of a second bus and to the sub-system (for example by means of a third bus), characterized in that it comprises the following steps:
- detection by the processor of first signals received from the communication interface on the first bus;
- reproduction of said first signals on the second bus.

As indicated above, these steps correspond for example to a first operating mode.

It is moreover possible to provide the following steps, for example for a second operating mode:

reception of information coming from the sub-system (via the third bus);

generation, on the second bus, of signals determined as a function of the information received.

The optional features described above in the context of the electronic unit can similarly be applied to such a method.

In particular, the method can comprise at least one of the following steps:

reproduction, by the processor (in the first mode) and on the first bus, of signals received from the secure element on the second bus;

transmission by the processor in an anticipated manner on the first bus, in response to said signals received from the communication interface, of expected signals coming from the secure element on the second bus;

transmission, by the processor (in the second mode), of data to the sub-system;

transmission, by the processor (in the second mode), of wait signals on the first bus to the communication interface;

switching, by the processor, from the first mode to the second mode on reception of specific data on the second bus coming from the secure element;

analysis, by the processor, of the data transmitted on the first bus;

switching, by the processor, from the first mode to the second mode when specific data are transmitted on the first bus and analyzed by the processor;

switching, by the processor, from the second mode to the first mode when the processing of data obtained by use of the sub-system is completed within the secure element.

DETAILED DESCRIPTION OF AN EXAMPLE OF EMBODIMENT

The following description given with reference to the appended drawings, given as non-limiting examples, will give a good understanding of what the invention consists of and of how it can be embodied.

Figure 1:
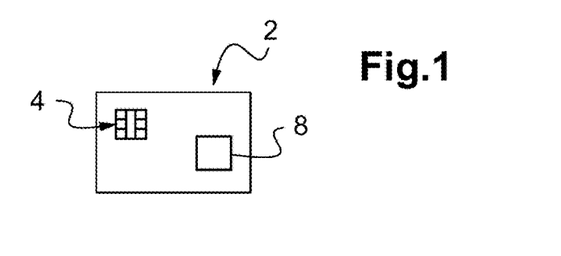
FIG. 1 is a plan view of an example of an electronic unit according to the invention.

In the appended drawings:

FIG. 1 shows an electronic unit according to the invention, in this case a microcircuit card 2.

The microcircuit card 2 comprises a communication interface 4 formed by a plurality of flush contacts at the level of the upper surface of the microcircuit card 2.

In the described embodiment, the microcircuit card 2 comprises moreover a biometric sensor 8 (in this case a fingerprint sensor) a part of which is also flush with the upper surface of the microcircuit card 2.

As a variant, it would be possible to use another sub-system instead and in place of (or possibly in addition to) the biometric sensor 8, for example a screen, a loud speaker or another user interface.

Figure 2:
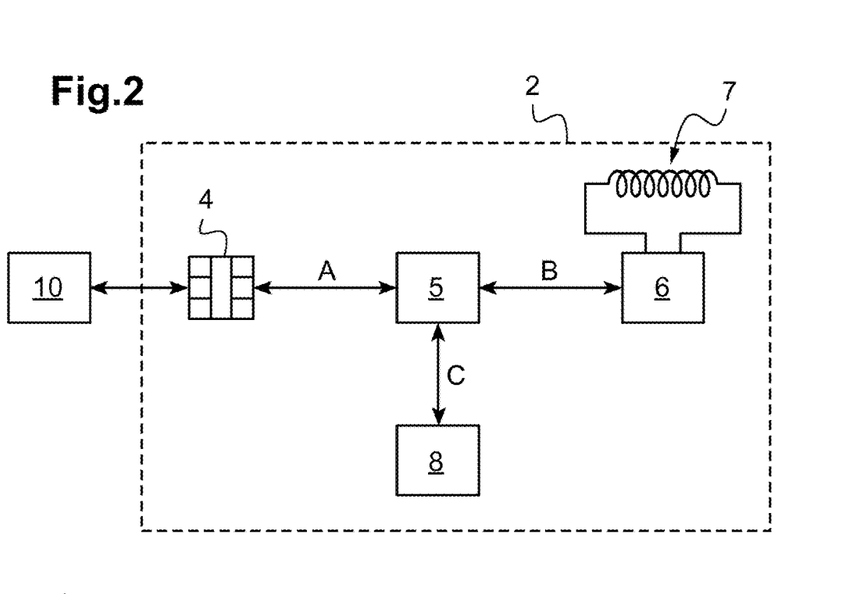
FIG. 2 is a diagrammatic representation of the principal elements of the electronic unit shown in FIG. 1, in a situation of being connected to a reader.

FIG. 2 shows the principal elements of the electronic unit 2 in a situation where the electronic unit 2 is connected, via its communication interface 4, to a reader 10 (which in practice occurs when the electronic unit 2 is inserted in the reader 10).

In addition to the communication interface (having contacts) 4 and the biometric sensor 8 already mentioned, the microcircuit card 2 comprises a microcontroller 5 and a secure element 6.

The microcontroller 5 comprises a processor (in this case a microprocessor), a random access memory and a non-volatile memory (or NVM, standing for "Non Volatile Memory"), generally rewritable (for example of the EEPROM, standing for "Electrically Erasable and Programmable Read-Only Memory", type or of the Flash type).

A memory of the microcontroller 5 (in this case the rewritable non-volatile memory) stores computer program instructions which can be executed by the processor of the microcontroller 5. Some of these instructions involve, when they are executed by the processor of the microcontroller 5, the use by the microcontroller 5 of the methods described below with reference to FIGS. 4 to 6.

The secure element 6 is produced in the form of a microcircuit (or integrated circuit) and this also comprises a processor (for example a microprocessor) and memories, such as a random access memory and a rewritable non-volatile memory. A memory of the secure element 6 (in this case the rewritable non-volatile memory) stores computer program instructions which can be executed by the processor of the secure element 6. Some of these instructions involve, when they are executed by the processor of the secure element 6, the use by the secure element 6 of the methods described below with reference to FIGS. 4 to 6.

The secure element 6 is moreover designed, because of its physical construction and of the design of the computer programs that it stores, in such a way as to make access (by reading and/or modification) to the data that it stores difficult, or even impossible, for an attacker. Thus, the secure element 6 has for example an EAL assurance level higher than 4 as defined in the Common Criteria (ISO15408 standard), for example an EAL4+ (VAN5) level or higher, and/or a level higher than 3 according to the FIPS (standing for "Federal Information Processing Standard") 140-2 standard.

The secure element 6 is connected to an antenna 7 by means of which the secure element 6 can exchange data with other electronic units via a short range radio link, such as a link conforming to the ISO1443 standard or using a technology of the Near Field Communication (usually referred to as NFC, standing for "Near Field Communication" in English) type.

The microcontroller 5 is connected on the one hand to the communication interface 4 by means of a first bus A and to the secure element 6 by means of a second bus B, in this case identical to the first bus A. On the other hand, in this case provision is made for the secure element 6 not to be directly connected to the communication interface 4.

In the described example, the first bus A and the second bus B are each designed to support data exchanges conforming to the ISO7816 standard.

When the microcircuit card 2 is inserted in the reader 10 and the microcontroller 5 is therefore connected to the reader 10 via the communication interface (having contacts)

4, a link conforming to the ISO7816 standard can thus be established (notably via the first bus A) between the reader 10 and the microcontroller 5.

Similarly, a link conforming to the ISO7816 standard can be established between the microcontroller 5 and the secure element 6 via the second bus B.

The microcontroller 5 and the biometric sensor 8 are themselves connected by a link C, in this case different from the one allowed by the first bus A or the second bus B, such as a serial link, for example of the SPI (standing for "Serial Peripheral Interface") or I2C (standing for "Inter Integrated Circuit") type.

As explained in a detailed manner below, the microcontroller 5 has two operating modes:
- in a first operating mode, the microcontroller 5 reproduces on the second bus B signals received from the communication interface 4 on the first bus A, and reproduces on the first bus A signals received from the secure element 6 on the second bus B;
- in a second mode, the microcontroller 5 generates on the second bus B signals determined as a function of information received (via the link C) from the biometric sensor 8 and transmits, to the biometric sensor 8 (via the link C), data (for example instructions) determined as a function of signals received on the second bus B.

Thus, in the first operating mode, the microcontroller 5 emulates the reader 10 for the secure element 6 and the secure element 6 for the reader 10: the reader 10 and the secure element 6 exchange signals (for example conforming to the ISO7816 standard) as though they were directly connected via the communication interface 4.

In the second operating mode, the microcontroller 5 acts as an intermediary and allows an exchange of data between the biometric sensor 8 and the secure element 6 even though these do not use the same communication protocol.

Provision can also be made that, during the second operating mode, the microcontroller 5 generates signals on the first bus A, to be sent to the reader 10 (for example wait signals) in such as way as to maintain the link established with the reader (in this case according to the ISO7816 standard), as explained below.

Figure 3:
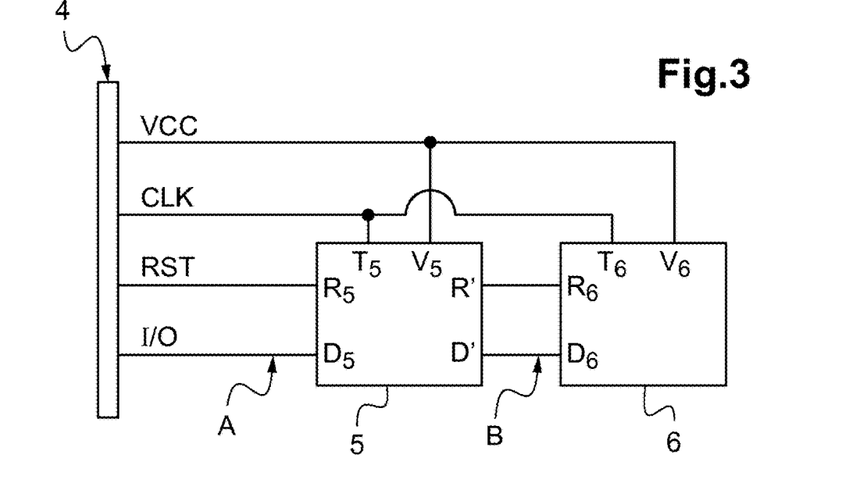
FIG. 3 shows an example of possible connection for some of the elements shown in FIG. 2.

FIG. 3 shows an example of connection that can be envisaged for the communication interface 4, the microcontroller 5 and the secure element 6.

As already indicated, the communication interface 4 is designed for carrying signals conforming to the ISO7816 standard and because of this comprises a contact VCC dedicated to a power supply signal, a contact CLK dedicated to a clock signal, a contact RST dedicated to a reset signal and a contact I/O dedicated to a data signal (of the input-output type, that is to say bidirectional).

In the example described here, the contact VCC is connected to a power supply pin $V_5$ of the microcontroller 5 and to a power supply pin $V_6$ of the secure element 6. Similarly, the contact CLK is connected to a clock pin $T_5$ of the microcontroller 5 and to a clock pin $T_6$ of the secure element 6.

The use of a common clock (represented by the signal carried by the contact CLK) for the microcontroller 5 and the secure element 6 facilitates the synchronization of these two elements during the processes described below.

The contact RST of the communication interface 4 is itself connected to a first reset pin $R_5$ of the microcontroller 5, whilst the contact I/O of the communication interface 4 is connected to a first data pin $D_5$ of the microcontroller 5, which corresponds to the first bus A mentioned above.

A second reset pin R' of the microcontroller 5 is moreover connected to a reset pin $R_6$ of the secure element 6 and a second data pin D' of the microcontroller 5 is connected to a data pin $D_6$ of the secure element 6, which corresponds to the second bus B mentioned above.

It is noted that the secure element 6 is designed to operate in the context of the ISO7816 standard (and can have been developed for the purpose of a preceding application in this context) and that the reset pin $R_6$ and the data pin $D_6$ of the secure element 6 are therefore intended in this context respectively to receive a reset signal such as the one present on the RST contact of the communication interface 4 and a data signal such as the one present on the I/O contact of the communication interface 4.

Figure 4:
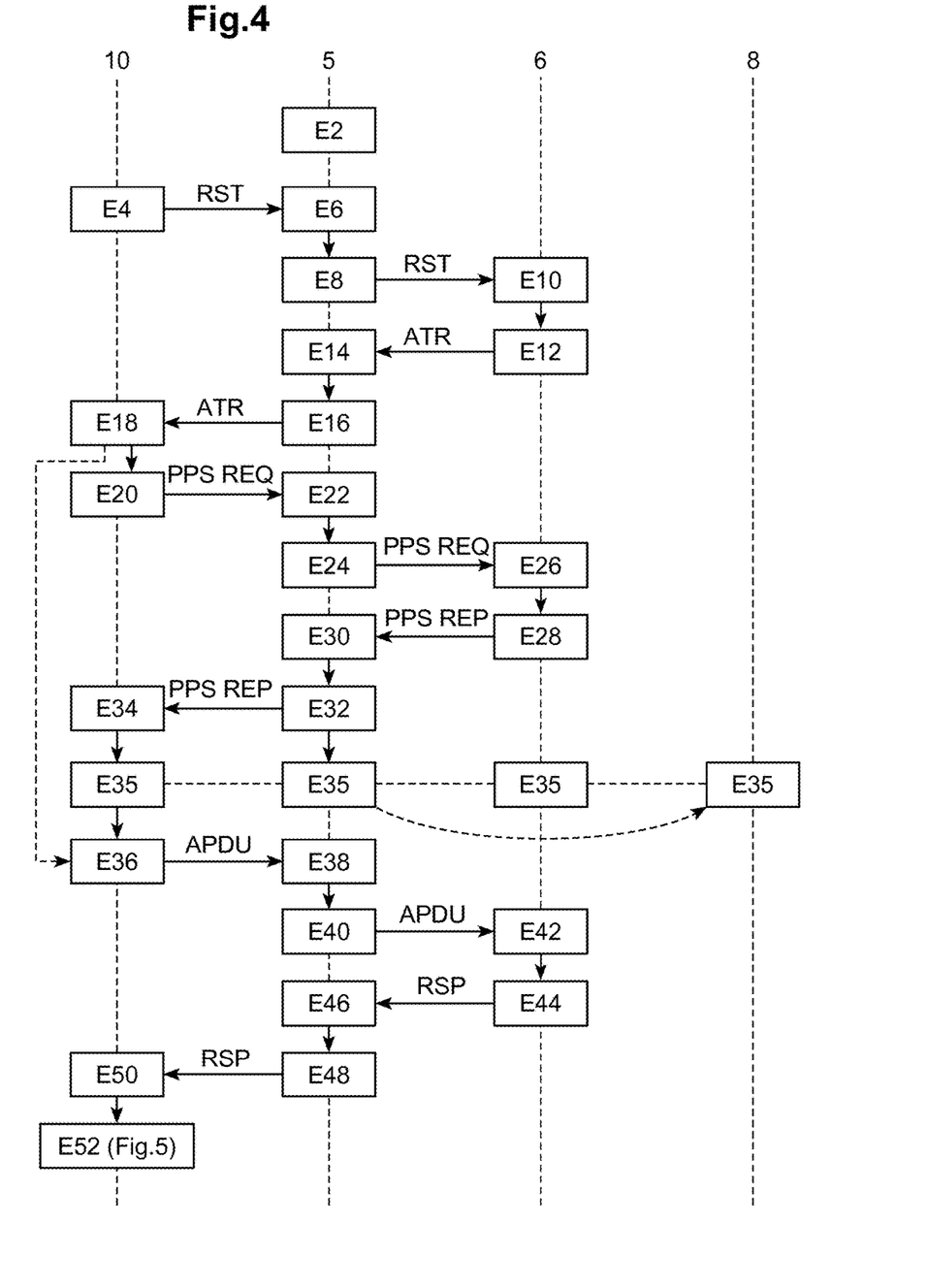
FIG. 4 is a flow chart illustrating a first part of an example of a method used in the electronic unit shown in FIG. 1.

FIG. 4 is a flow chart illustrating a first part of an example of a method used in the electronic unit 2.

This method begins when the microcircuit card 2 is inserted in the reader 10 and when a power supply voltage (provided by the reader 10 and carried by the contact VCC of the communication interface 4) is thus present on the power supply pins V5, V6 of the microcontroller 5 and of the secure element 6.

When it is powered up, the microcontroller 5 is initialized in its first operating mode (step E2) and waits for a signal coming from the reader 10.

The reader 10 transmits, in step E4, a reset signal (high level on the contact RST) which is transmitted to the microcontroller via the first bus A (precisely via the contact RST and the first reset pin $R_5$).

The microcontroller 5 thus receives, in step E6 the reset signal and generates a signal of the same type on the second bus B, to be sent to the secure element 6, in this case by setting the signal present on the second reset pin R' at the high level (step E8).

This reset signal is received by the secure element 6 in step E10 (by the reset pin $R_6$ changing to the high level).

The secure element 6, which is designed as already indicated to operate in conformity to what is provided by the ISO7816 standard, prepares a response in the form of an ATR message (ATR standing for "Answer To Reset") and transmits this message in step E12 on the second bus B, precisely on the data pin $D_6$. The ATR message contains data relating to the secure element 6 (type of secure element, status of the secure element) and communication parameters proposed by the secure element 6.

The microcontroller 5 receives, in step E14, the ATR message via the second bus B (precisely on the second data pin D') and transmits it on the first bus A, that is to say to the reader 10 and via the communication interface 4, in step E16, by reproducing on the first data pin $D_5$ the signals detected on the second data pin D'.

According to a variant which can be envisaged, in order to comply with certain temporal constraints imposed by the ISO7861 standard, the microcontroller 5 anticipates the transmission on the first bus A (to the reader 10) of certain data forming the ATR message, for example the first byte of the ATR message (of constant value equal to 3B in hexadecimal). The data transmitted in an anticipated manner are for example transmitted between the steps E6 and E8 described above, or during or immediately after step E8. In such a case, only the data which have not been transmitted in an anticipated manner are reproduced on the first bus A (in this case the data forming the ATR other than the first byte of hexadecimal value 3B).

The microcontroller can possibly analyze the data transmitted within the ATR message, notably in order to check the status of the secure element 6 and to become aware of the proposed communication parameters.

The reader 10 thus receives the ATR message in step E18 and can process the data contained in that message.

It is noted that the reader 10 and the secure element 6 operate as though they were directly connected to each other, as provided for in the ISO7816 standard. In the first operating mode, the microcontroller 5 therefore acts like a tunnel through which passes the information exchanged between reader 10 and the secure element 6.

When the connection parameters received within the ATR message indicate that the secure element 6 imposes a specific communication protocol, (that is to say in the presence of type $TA_2$ data in the context of the ISO7816 standard), the method jumps directly to step E36 (as indicated by an arrow drawn in dotted line in FIG. 4).

If, on the contrary, the communication protocol is not imposed (that is to say in the absence of $TA_2$ data in the context of the ISO7816 standard), the method continues as indicated at present for negotiation of the communication protocol between the reader 10 and the secure element 6.

The reader transmits, in step E20, a request of the PPS (standing for "Protocol and Parameters Selection") type on the communication interface 4 (precisely on the I/O contact). The PPS request is accompanied by parameters envisaged for the communication (for example, in the context of the ISO7816 standard, by data representing an integer Fi and by data representing an integer Di, the ratio Fi/Di indicating the number of clock periods corresponding to an elementary time unit—or ETU standing for "Elementary Time Unit", which corresponds to the duration allocated to the transmission or the reception of a data bit). These parameters are for example determined by the reader 10 as a function of the data appended to the ATR message received in step E18.

The PPS request accompanied by the communication parameters is received by the microcontroller 5 via the first bus A (precisely on the first data pin $D_5$) in step E22, which allows the microcontroller 5 to become aware of the communication parameters and to store data relating to the type of communication envisaged (these stored data being for example identical to the data accompanying the PPS request).

The microcontroller 5 then transmits the PPS request to the secure element 6 (step E24) by reproducing on the second bus B (in this case on the second data pin D') the signals received in step E22 on the first bus A.

The secure element 6 thus receives, via the second bus B, the PPS request and the parameters envisaged for the communication (step E26) and processes these elements, for example by storing the received parameters and accepting them.

As provided by the ISO 7816 standard, in the case of acceptance of the communication parameters by the secure element 6, the latter transmits (in this case in step E28) a response PPS accompanied by parameters identical to those received in step E26.

The microcontroller 5 therefore received this response PPS via the second bus B in step E30.

The microcontroller 5 can thus check that the communication parameters appended to the response PPS are identical to those received (and stored) in step E22, which confirms that the secure element 6 has accepted to set up a communication with those parameters. The microcontroller 5 can then possibly adapt its own configuration to the specified communication parameters in order to process correctly the subsequent exchanges, as indicated below in step E35.

The microcontroller 5 transmits moreover the response PPS to the reader 10 via the first bus A (step E32), by reproducing on the first bus A (in this case on the first data pin $D_5$) the signals received in step E30 on the second bus B (in this case on the second data pin D').

The reader 10 receives, in step E34, the response PPS accompanied by the communication parameters, identical to those transmitted in step E20 in the described example, as if the secure element 6 had responded directly via the communication interface 4.

In this case, the communication parameters are adopted for the continuation of the exchanges. In order to do this, the reader 10, the microcontroller 5 and the secure element 6 (as well as possibly the sub-system 8, for example under the control of the microcontroller 5) each update their communication parameters in step E35 (in accordance with the parameters negotiated as indicated above).

The reader 10 then continues its operation by transmitting, in step E36, a command of the APDU (standing for "Application Protocol Data Unit") type on the communication interface 4 (precisely in this case on the I/O contact).

The microcontroller 5 detects, in step E38, the signals corresponding to that APDU command on the first bus A. In order to do this, as indicated above, the microcontroller 5 takes account, if necessary, of the communication parameters received with the PPS response in step E30. The microcontroller 5 can also analyze the detected signals, for example in order to be able to determine in advance at what time the signals representing the APDU command are completed.

The microcontroller 5 then transmits (step E40) the APDU command to the secure element 6 via the second bus B by reproducing on that second bus B the signals detected on the first bus A during step E38. After this step E40, the microcontroller 5 analyzes the signals from the second bus B whilst waiting for step E46 described below.

The secure element 6 receives this APDU command via the second bus B in step E42 and carries out the processing required by that command.

Once the processing has been carried out, the secure element 6 transmits, in step E44, a response message RSP on the second bus B, which includes a status of the response (in the context of the ISO7816 standard, two bytes of value 9000 in hexadecimal when the processing has been carried out correctly) and possibly response data.

The response message RSP is detected by the microcontroller 5 in step E46 and transmitted by the microcontroller 5 to the reader 10 via the first bus A (step E48) by reproduction, on the first bus A (in this case on the first data pin $D_5$), of the signals detected in step E46 on the second bus B (precisely in this case on the second data pin D').

The response message RSP is thus received by the reader 10 in step E50.

It is noted that the process which has just been described in steps E36 to E50 can be repeated for any command of the APU type transmitted by the reader 10 and whose processing can be carried out by the secure element 6 alone.

There will now be described with reference to FIG. 5 an example of a process used when the processing requested by a command of the APDU type requires the use of another sub-system, in this case the biometric sensor 8.

Figure 5:
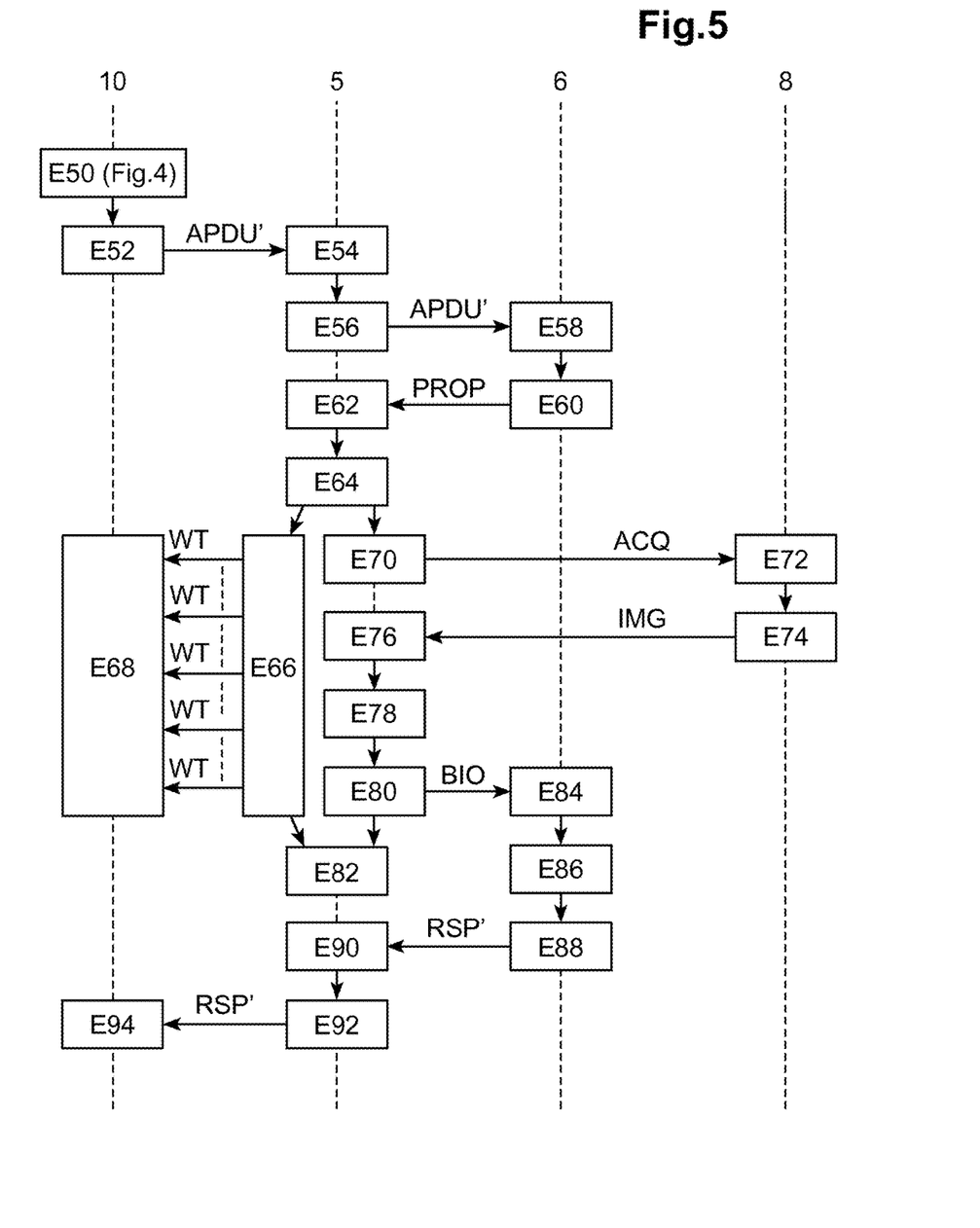
FIG. 5 is a flow chart illustrating the second part of this method.

FIG. 5 is in fact a flow chart showing the continuation of the process which has just been described with reference to FIG. 4.

In step E52, the reader 10 transmits a command of the APDU type (referenced APDU' in FIG. 5) to the electronic unit 2, that is to say on the communication interface 4. This command APDU' is for example accompanied by a message to be signed.

The signals representing this command APDU' are detected on the first bus A (precisely on the first data pin $D_5$) by the microcontroller 5 during step E54 and reproduced on the second bus B (precisely on the second data pin D') during step E56, in a way similar to that which was described above in steps E36 and E38.

The secure element 6 therefore receives the command APDU' via the second bus B in step E58 and then initiates the processing required by that command.

It is considered in this case that the command APDU' necessitates for its processing the use of a sub-system of the electronic unit 2 connected to the microcontroller 5, in this case this sub-system being the biometric sensor 8.

The secure element 6 therefore determines, on reception of the command APDU' (step E58) that the processing of this command necessitates biometric data captured by the biometric sensor 8 and in order to do this transmits, in step E60, on the second bus B (in this case on the data pin $D_6$), specific data PROP (or pattern), indicative of a request for data coming from the sub-system (in this case biometric data).

The specific data PROP are received, in step E62, by the microcontroller 5, which determines, by analysis of these data, that the use of the sub-system (biometric sensor 8) is required.

The microcontroller 5 then switches (step E64) into its second operating mode.

In this second operating mode, the microcontroller 5 regularly transmits (for example periodically) wait messages WT on the first bus A to the reader 10, as represented diagrammatically in step E66 in FIG. 5. Such a wait message WT is for example the NULL byte (of value 60 in hexadecimal) of a procedure message intended for the reader 10 in the context of the T=0 protocol provided by the ISO78176 standard, or a response time extension request (or "WTX request") block in the context of the T=1 protocol.

The reader 10 receives these wait messages WT (as represented diagrammatically in step E68), which makes it possible to keep the communication between the reader 10 and the electronic unit (microcircuit card) 2 effective whilst the following processings are carried out.

In fact, during the second operating mode, the microcontroller 5 calls upon the sub-system (in this case the biometric sensor 8) via the link C (step E70), for example by transmitting on the link C a request intended for the sub-system, in this case a request ACQ to acquire biometric data.

The sub-system (in this case the biometric sensor 8) receives this request in step E72 and carries out the processing indicated by that request, in this case an acquisition of biometric data biometric data.

The data generated by this processing (in this case an image IMG captured by the biometric sensor 8, in this instance an image of a fingerprint) are transmitted via the link C, in step E74, to the microcontroller 5.

The microcontroller 5 receives, via the link C, the data generated by the sub-system (in this case the image IMG generated by the biometric sensor 8) in step E76 and proceeds with a possible processing of these data (step E78), such as an extraction of biometric characteristics BIO (or "template"), in this case characteristics representing the fingerprint presented in the image IMG, for example a set of minutiae.

The microcontroller 5 then possibly reformats the data obtained thanks to the use of the subsystem (raw data generated by the sub-system and/or data resulting from the processing in step E78, in this case the extracted biometric characteristics BIO) in such a way that they can be transmitted in step E80 on the second bus B, for example within APDU commands or in conformity with another standardized or proprietary protocol. The aforesaid formatting of the data comprises for example an encapsulation of the data within a data block having a predetermined format (and representing for example a command). As a variant, no formatting is carried out and the raw data (generated by the sub-system) are (directly) transmitted on the second bus B in step E80.

The microcontroller 5 can then switch into the first operating mode (step E82) and wait for signals on the second bus B. The microcontroller 5 can thus terminate on this occasion the periodic transmission of the wait messages WT. It is noted that the switching of the microcontroller 5 into the first operating mode can possibly be carried out only when the processing (described below) of the data obtained by the use of the sub-system is completed within the secure element 6.

The secure element 6 receives, in step E84, the data obtained by the use of the sub-system, in this case the biometric characteristics BIO, via the second bus B. It is noted that the secure element 6 had been waiting for these data since its transmission of the specific data PROP in step E60.

The secure element 6 can thus carry out, in step E86, the processing corresponding to the command APDU' (received in step E58) by using the data obtained by the use of the sub-system (in this case the biometric characteristics BIO). This processing comprises for example the comparison of the data received in step E84 with corresponding data stored in the secure element 6 and, in the case of success of the comparison, the signing of the message to be signed (appended to the command APDU' as indicated above) by means of a secret key (or private key) stored in the secure element 6, that is to say the application to the message to be signed of a cryptographic signature algorithm using the secret key.

As a variant, the processing could be for example the unblocking of a functionality of the secure element 6, this functionality being possibly a specific command which can be executed by the secure element 6 or an applet stored in the secure element 6.

The secure element 6 transmits a response message RSP' (containing the signed message in the case of success of the aforesaid comparison) on the second bus B (step E88). It is possible moreover to make provision for the response message RSP' to contain an error code in the case of failure of the aforesaid comparison (or other operational anomaly).

The microcontroller 5 detects the signals representing this response message RSP' on the second bus B in step E90 and reproduces these signals on the first bus A (step E92).

The reader 10 thus receives the response message RSP' in step E94 (via the communication interface 4) as if it had been transmitted directly by the secure element 6 on the communication interface 4.

Figure 6:
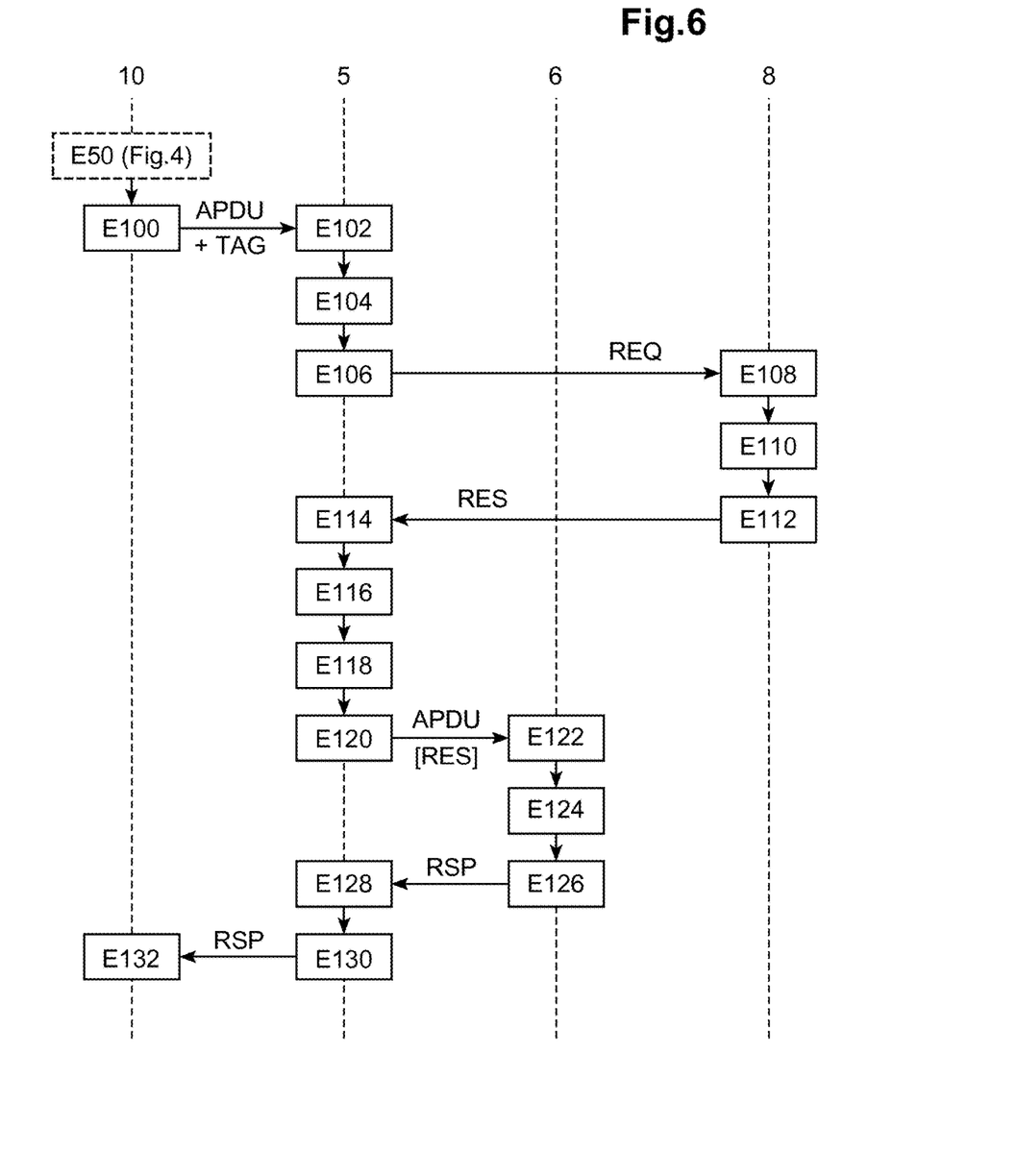
FIG. 6 is a flow chart illustrating a variant embodiment of this second part of the method.

FIG. 6 is a flow chart illustrating a variant embodiment of the method which has just been described with reference to FIG. 5.

So such a method variant follows for example a method such as the one described with reference to FIG. 4 (up to step E50).

The reader 10 transmits a command of the APDU type on the communication interface 4 in step E100. This command includes a tag TAG indicating that biometric data are required by the secure element 6 in order to process the command. This tag TAG can be either the command itself (for example when it is possible to derive from the type of the command that biometric data are required, as is the case for example for a biometric check command), or specific additional data appended to the command.

The microcontroller 5 receives the command including the tag TAG via the first bus A in step E102 and analyzes the received data.

The microcontroller 5 stores for example a list of the commands of the APDU type for which provision has been made for the microcircuit card 2 to impose the presence of its bearer (checked with the help of the fingerprint sensor 8): the microcontroller 5 can thus compare the type of the command received with the stored types of command. In this case, as already indicated, the tag TAG detected by the microcontroller 5 corresponds to the type de command.

As a variant, the microcontroller 5 searches in the received data for the abovementioned specific additional data.

Because of the detection (during the analysis of the data by the microcontroller 5) of the tag TAG, the microcontroller 5 switches, in step E104, into its second operating mode.

Although not shown in FIG. 6, the microcontroller 5 can possibly periodically transmit wait messages on the first bus A, to the reader 10, throughout the whole of the duration of the second operating mode.

The microcontroller 5 transmits, in step E106, a request REQ for the acquisition of biometric data to the biometric sensor 8 via the link C.

The biometric sensor 8 receives this request REQ in step E108 and launches, in step E100, an acquisition of the biometric data (for example an image of the bearer's fingerprint) and a possible processing.

The biometric data obtained RES in step E110 are transmitted in response to the microcontroller 5 in step E112.

The microcontroller 5 receives the biometric data RES in step E114.

The microcontroller 5 can then possibly proceed with an additional processing of the received biometric data (for example, as in the context of FIG. 5, with an extraction of the biometric characteristics).

The microcontroller 5 then proceeds, in step E116, with the formatting of the biometric data (processed if necessary), in this case in the format of the ISO7816 standard.

The microcontroller 5 switches moreover, in step E118, into the first operating mode.

The microcontroller 5 then transmits on the second bus B the command received in step E102 (step E120), by reproducing on the second data pin D' the signals detected on the first data pin $D_5$ during step 102.

The microcontroller 5 also transmits on the second bus B, during this step E120, the formatted biometric data (for example according to a format defined by a standard, such as the ISO 19794 standard, or a proprietary standard, in general the format corresponding to a format adapted to the comparison step described below).

The secure element 6 receives the command and the biometric data in step E122 and proceeds with the processing of the command in step E124.

This processing comprises for example the comparison of the biometric data received with biometric data stored in the secure element 6, possibly as well as, in the case of positive comparison, the signing of a message (which can be appended to the received command) by means of a cryptographic algorithm using a secret key stored in the secure element 6.

The secure element 6 transmits a response message RSP (which possibly includes response data, such as the aforesaid signed message) on the second bus B (that is to say by the transmission of signals representing that response message RSP on the data pin $D_6$).

Notably because it is then in its first operating mode, the microcontroller 5 detects these signals on its second data pin D' in step E128 and reproduces these signals on its first data pin (that is to say on the first bus A) in step E130.

The reader 10 thus receives (via the communication interface 4) the response message RSP in step E132.

The invention claimed is:

1. An electronic unit, comprising:
   a communication interface;
   a processor;
   a secure element; and
   a sub-system,
   the processor being connected to the communication interface, by means of a first bus, to the secure element by means of a second bus and to the sub-system,
   wherein the processor operates, in a first mode, to reproduce, on the second bus, signals received by the processor from the communication interface on the first bus, and
   wherein the processor also operates, in the first mode, to reproduce, on the first bus, signals received by the processor from the secure element on the second bus.

2. The electronic unit as claimed in claim 1, wherein the processor, in addition to the first mode, is also configured to operate in a second mode, alternate from the first mode, where the processor in the second mode generates on the second bus signals determined as a function of information received from the sub-system.

3. The electronic unit as claimed in claim 1, wherein the processor is configured to transmit in an anticipated manner on the first bus, in response to said signals received from the communication interface, expected signals coming from the secure element on the second bus.

4. The electronic unit as claimed in claim 1, wherein the sub-system is a man machine interface or a communication module.

5. The electronic unit as claimed in claim 2, wherein the processor transmits, in the second mode, data to the sub-system.

6. The electronic unit as claimed in claim 2, wherein the processor transmits, in the second mode, wait signals on the first bus to the communication interface.

7. The electronic unit as claimed in claim 2, wherein the processor analyzes the data transmitted on the first bus, and switches from the first mode to the second mode when specific data are transmitted on the first bus and analyzed by the processor.

8. The electronic unit as claimed in claim 2, wherein the processor switches from the second mode to the first mode when the processing of data obtained by use of the sub-system is completed within the secure element.

9. An electronic unit, comprising:
   a communication interface;
   a processor;
   a secure element; and
   a sub-system,
   the processor being connected to the communication interface, by means of a first bus, to the secure element by means of a second bus and to the sub-system,
   wherein the processor operates, in a first mode, to reproduce, on the second bus, signals received from the communication interface on the first bus, wherein the processor, in addition to the first mode, is also configured to operate in a second mode, alternate from the first mode, where the processor in the second mode generates on the second bus signals determined as a function of information received from the sub-system, and wherein the processor switches from the first mode to the second mode upon reception of specific data on the second bus coming from the secure element.

10. A method carried out by an electronic unit that has a communication interface, a processor, a secure element, and a sub-system, the processor being connected to the communication interface, by means of a first bus, to the secure element by means of a second bus and to the sub-system, the method comprising:

detecting, by the processor, first signals received by the processor from the communication interface on the first bus;

reproducing, by the processor operating in a first mode, said first signals on the second bus; and reproducing, on the first bus by the processor operating in the first mode, signals received by the processor from the secure element on the second bus.

11. The method as claimed in claim 10, further comprising:

receiving, by the processor, information coming from the sub-system (8); and generating, on the second bus by the processor operating in a second mode, signals determined as a function of the information received.

12. The method as claimed in claim 10, further comprising:

transmitting, by the processor, in an anticipated manner on the first bus, in response to said signals received from the communication interface, expected signals coming from the secure element on the second bus.

13. The method as claimed in claim 10, further comprising:

transmitting, by the processor operating in the second mode, data to the sub-system.

14. The method as claimed in claim 10, further comprising:

transmitting, by the processor operating in the second mode, wait signals on the first bus to the communication interface.

15. The method as claimed in claim 10, further comprising:

switching, by the processor, from the first mode to the second mode upon reception of specific data on the second bus coming from the secure element.

16. The method as claimed in claim 10, further comprising:

analyzing, by the processor, the data transmitted on the first bus and of switching, by the processor, from the first mode to the second mode when specific data are transmitted on the first bus and analyzed by the processor.

17. The method as claimed in claim 15, further comprising:

switching, by the processor, from the second mode to the first mode when the processing of data obtained by use of the sub-system is completed within the secure element.

18. The method as claimed in claim 10, wherein the sub-system is a man machine interface or a communication module.

* * * * *